United States Patent
Bober et al.

(10) Patent No.: US 6,356,647 B1
(45) Date of Patent: Mar. 12, 2002

(54) HOUGH TRANSFORM BASED METHOD OF ESTIMATING PARAMETERS

(75) Inventors: Miroslaw Bober; Josef Kittler, both of Guildford (GB)

(73) Assignee: Telefonaktiebolaget LM Ericsson, Stockholm (SE)

(*) Notice: Subject to any disclaimer, the term of this patent is extended or adjusted under 35 U.S.C. 154(b) by 0 days.

(21) Appl. No.: 09/227,346

(22) Filed: Jan. 8, 1999

Related U.S. Application Data

(63) Continuation of application No. PCT/SE97/01293, filed on Jul. 18, 1997.

(30) Foreign Application Priority Data

Jul. 19, 1996 (SE) .............................................. 9602820

(51) Int. Cl.⁷ .................................................. G06K 9/00
(52) U.S. Cl. ...................................... 382/107; 382/281
(58) Field of Search ................................. 382/100, 236, 382/104, 105, 107, 181, 171, 173, 172, 190, 260–265, 281; 356/139.01

(56) References Cited

U.S. PATENT DOCUMENTS

| | | | | |
|---|---|---|---|---|
| 4,952,772 A | * | 8/1990 | Zana | 219/124.34 |
| 5,027,419 A | * | 6/1991 | Davis | 382/206 |
| 5,420,637 A | * | 5/1995 | Zeevi et al. | 375/240.12 |
| 5,842,194 A | * | 11/1998 | Arbuckle | 706/52 |
| 5,930,378 A | * | 7/1999 | Kubota et al. | 382/107 |

OTHER PUBLICATIONS

Signals Systems and Computers, "Recursive Hough Transform Tracking For Sonar Motion Estimation", vol. 1, 1988, pp. 440–444.*

Electrical and Computer Engineering, "Detecting corenrs using the 'patchy' Hough transform", 1994, vol. 2, pp. 576–579.*

Image and Vision Computing, vol. 12, No. 10, Dec. 1994, Miroslaw Bober et al., "Estimation of complex multimodal motion: an approach based on robust statistics and Hough transform," pp. 661–668.

Proceedings of the IEEE Computer Society Conference on Computer Vision and Pattern Recognition, Jun. 21–23, 1994, (Seattle, Washington, USA), Miroslaw Bober et al., "Robust Motion Analysis," pp. 947–952.

Signal Processing: Image Communication, vol. 6, No. 6, 1995, Amichay Amitay et al., "Global–motion estimation in image sequences of 3–D scenes for coding applications," pp. 507–520.

(List continued on next page.)

*Primary Examiner*—Jayanti K. Patel
(74) *Attorney, Agent, or Firm*—Nixon & Vanderhye P.C.

(57) ABSTRACT

A Hough transform based method of estimating N parameters $a=(a_1, \ldots, a_N)$ of motion of a region Y in a first image to a following image, the first and following images represented, in a first spatial resolution, by intensities at pixels having coordinates in a coordinate system, the method including: determining the total support $H(Y,a)$ as a sum of the values of an error function for the intensities at pixels in the region Y; determining the motion parameters a that give the total support a minimum value; the determining being made in steps of an iterative process moving along a series of parameter estimates $a_1, a_2, \ldots$ by calculating partial derivatives $dH_i = MH(Y,a_n)/Ma_{n,i}$ of the total support for a parameter estimate $a_n$ with respect to each of the parameters $a_i$ and evaluating the calculated partial derivatives for taking a new $a_{n+1}$; and wherein, in the evaluating of the partial derivatives, the partial derivatives $dH_i$ are first scaled by multiplying by scaling factors dependent on the spatial extension of the region to produce scaled partial derivatives $dHN_i$.

77 Claims, 7 Drawing Sheets

OTHER PUBLICATIONS

Proceedings of the Pacific Rim Conference on Communications, Computers and Signal Processing, May 19–21, 1993, (Victoria, British Columbia, Canada), Hidonby Ida et al., "Extraction of Motion from Spatio–Temporal Image Using the 3–Dimensional Hough Transform," pp. 174–177.

Visual Communication and Image Processing '91: Visual Communication, Nov. 11–13, 1991, (Boston, Massachusetts, USA), Shigeyoshi Nakajima et al., "Three–dimensional motion analysis and structure recovering by multi-stage Hough transform," pp. 709–719.

Proceedings of the Fifth International Conference on Computer Vision, 1995, Cambridge, Mass., Tina Yu Tian et al., "Recovering 3–D Motion of Multiple Objects Using Adpative Hough Transform," pp. 284–289.

Pattern Recognition Letters, vol. 16, No. 9, Sep. 1995, Jukka Heikkonen, "Recovering 3–D motion parameters from optical flow field using randomized Hough transform," pp. 971–978.

* cited by examiner

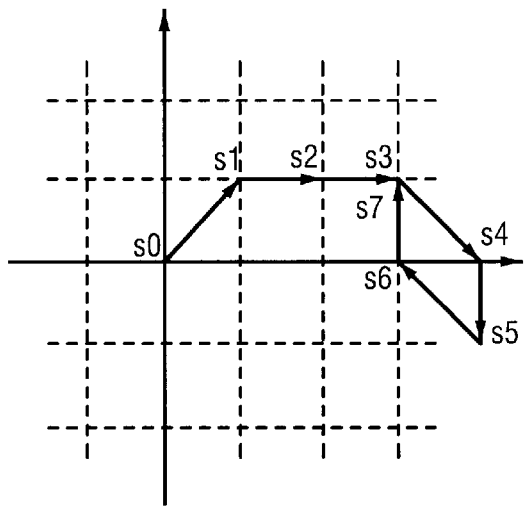
Fig. 5a
| Position | Support |
|---|---|
| ...... | ...... |
| s3 | 456 |
| s4 | 676 |
| s5 | 877 |
| s6 | 523 |
| s7 | 456 |
Fig. 5b
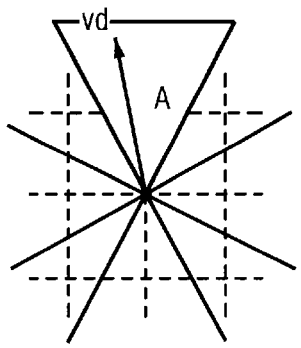
Fig. 5c
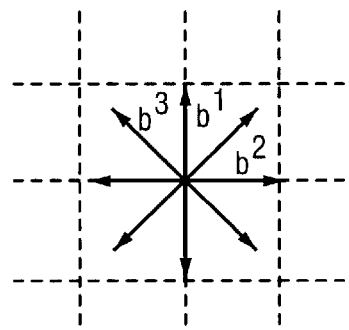
Fig. 5d

| Resolution in the image space | | Sr1 original | Sr2 subsampled by 4 |
|---|---|---|---|
| Resolution in the parameter space | Pr1 1.25 | | ①  |
| | Pr2 0.25 | ③ | ② |
| | Pr3 0.05 | ④ | |
| | Pr4 0.01 | ⑤ | |

Fig. 6 k-value

| Resolution in the image space | | Sr1 original | Sr2 subsampled by 4 |
|---|---|---|---|
| Resolution in the parameter space | Pr1 1.25 | | 1 |
| | Pr2 0.25 | 2 | 1 |
| | Pr3 0.05 | 5 | |
| | Pr4 0.01 | 5 | |

Fig. 7

HOUGH TRANSFORM BASED METHOD OF ESTIMATING PARAMETERS

This application is a continuation of Ser. No. PCT/SE97/01293 filed Jul. 18, 1997.

TECHNICAL FIELD

The present invention relates to a method and a device for simultaneous motion estimation and segmentation of digitized images, in particular moving pictures.

BACKGROUND OF THE INVENTION AND PRIOR ART

In compression of digitized motion pictures the use of motion estimation is a widely used and powerful tool. One commonly used technique for motion estimation is Block Matching (BM) and variants, see for instance A. N. Netravali, B. G. Haskell "Digital Pictures Representation, Compression and Standards", Planum Press, ISBN 0-306-44917-X.

Block matching techniques usually make the following assumptions:
1) A block moves with translational motion in the image plane.
2) There is only one moving object within a block.
3) The intensities of the pixels are preserved in time.

There are several problems with the block Matching technique and its variants:
i) They give an erroneous estimate if a block covers several moving objects or uncovered background.
ii) They are sensitive to noise in the input frames.
iii) The accuracy of the estimate is generally poor, especially if no sub-pixel matching is performed. If sub-pixel matching is performed the technique is computationally expensive and real-time implementation is difficult to obtain.
iv) The estimate is poor for blocks moving with non-translatory motion.
v) The estimates are sensitive to illumination changes.

Other frequently used techniques for motion estimation are based on phase-correlation. Their deficiencies are similar to the ones of block matching, i.e. a poor estimate accuracy and robustness to noise, and inability to cope with complex motions, i.e. non-translational and multimodal motions.

Another possible technique is to perform motion estimation based on an image which as been segmented into regions. The image can for example be segmented into regions of slowly varying intensity.

A region based technique, which is conceptually based on the Hough transform and uses Robust Statistical Kernels has been presented in the papers M. Bober and J. Kittler, "Robust Motion Analysis", in the CVPR Conference proceedings, 1994, pages 947–952; M. Bober and J. Kittler, "Estimation of Complex Multi-modal Motion: An Approach based on Robust Statistics and Hough Transform", Proceedings of the British Machine Vision Conference, 1993 pages 239–248 and M. Bober and J. Kittler, "Estimation of general multimodal motion: an approach based on robust statistics and Hough transform", Image and Vision Computing, 1994, vol 12, No 12, pages 661–668, which are incorporated herein by reference.

This method performs simultaneous motion estimation and segmentation by iteratively maximising the support defined by a sum of errors weighted by a robust kernel between two regions: one in a reference frame and the other in the consecutive frame. The position and size of the reference block are arbitrary; whereas the position of the consecutive region is determined by a geometric transformation of the reference block. This prior art technique is also illustrated by the flow diagram in FIG. 8, which shows how input frames are low-pass filtered in a block 801. Then a coarse resolution is set in a block 803, and motion parameters are initialised in a block 805. Thereafter derivatives are calculated in a block 807, which are used for updating the estimate in a block 809. Based on the estimate a new scale is computed in a block 811. After this it is checked in block 813 if the path has retraced. If that condition is false the process returns to the block 807, else a new check is made in a block 815 if the finest resolution is reached. If that is the case the process is terminated in a block 819, and else the resolution is changed to a finer resolution in a block 817 and then the process returns to the block 807.

The parameters of the transformation which maximise the support measure are assumed to describe the motion of the block or image. According to the prior art technique described in the papers by M. Bober and J. Kitler, cited above, the statistical properties of the transformed frame difference are computed after each iteration and the shape of the kernel function is adjusted accordingly.

Contributions to the support measure from pixels with large motion compensation errors are weighted down or removed by the robust kernel. Such pixels usually belong to objects moving independently or a covered/occluded background and are termed outliers. Thus, a mechanism for simultaneous motion estimation and segmentation is introduced by the robust kernel.

The technique described in the above cited prior art papers solved some of the problems associated with the block matching and correlation-based techniques. Hence, the technique can cope with non-translatory motions, e.g. affine models, and with multiple moving objects within a block. However, the technique still exhibits several deficiencies, such as failing to converge for regions with complicated motions and still being computationally expensive.

SUMMARY OF THE INVENTION

It is an object of the present invention to overcome the problems associated with the prior art technique and to increase its robustness and the quality of the motion segmentation.

This object is obtained by adding new steps and by modification of some parts of the prior art technique.

In particular, the invention aims at solving the problems with the convergence of the prior art technique as described in the above cited papers by M. Bober and J. Kittler, and to increase the computational efficiency thereof. According to the invention, a modified gradient-based search technique is used and the centre of the coordinate system is placed in the centre of the region, image or block, where the estimation is applied. The use of such modified gradients, i.e. gradients scaled by different factors reduce the number of iterations needed, and thus also the complexity of the technique. It also improves the convergence, i.e. the modified search is more likely to converge to the true motion parameters.

Further, the median absolute deviation is used in the prior art technique as scale estimate. This has turned out to cause problems with convergence and accuracy. When there is only one moving object within a block, during iterations on finer resolutions, the values of scale become very small and many pixels, which are not outliers, are removed from the estimation process. To overcome this deficiency, a small constant is added to the MAD (Median Absolute Deviation) estimate of scale.

Further, in the prior art technique, the scale of residual errors has to be recomputed after each update of motion parameters. This has been found to be very inefficient, and the efficiency of the method has been found to be significantly improved by introducing the following modification. When iterations proceed on the coarse resolution in the parameter space, the scale is updated after each step. However, on finer resolutions, i.e. subpixel resolution in case of a translational motion model, the scale is only updated every k steps, k being an integer greater than one.

Moreover, the optimisation on the discrete grid, as described in the prior art, does not specify how to select a good starting point for the interations after a change of resolution in the parameter space. The description only defines the condition for change of the resolution in the parameter space when the path retraces. It has now been found that if during iterations, a record of the point in the parameter space corresponding to the lowest value of the error function is saved and used as the starting point at finer resolution, a significant improvement of the computational efficiency is obtained.

In addition, a good iteration termination condition is not stated in the prior art. However, it has been found that the iteration can be terminated, and provide a good result when one of the following conditions is fulfilled:

i) the number of iterations at a given resolution exceeds the iteration threshold, or
 ii) the value of the median estimate of scale is below the scale threshold, or
 iii) the path is retraced on the finest resolution:

Furthermore, the speed and convergence of the prior art technique have been found to be possible to improve, e.g. for sequences with large motion. In order to improve the speed and convergence, a hybrid scheme where the initial estimate at coarse resolution is determined by a non-iterative technique, such as the phase-based technique, can be used. That is, first at the low resolution stage a fast non-iterative technique is used. Then, at the medium or fine resolution stages the modified Hough Transform using Robust Statistical Kernels is used.

Further, the prior art technique is only applied to a block, i.e. regions of rectangular size, and the centre of the coordinate system is placed in the corner of the image. However, it has been found that the framework is not limited to block shaped regions, but can be extended to regions of any shape. In the latter case, the placement of the centre of the coordinate system however becomes crucial for the performance of the technique. It has been found that by using the centre of gravity of the reference region as the origin of the coordinate system, a good performance is obtained.

Further, in the prior art technique, it is not specified what the specific resolution for motion parameters a1. . . a6 nor what the relation between parameters should be. A solution to this problem is to relate the resolution in parameter space to the maximum displacement which the estimator is expected to estimate and to the size of the region.

Finally, the accuracy of the prior art technique has been found to be improved by prefiltering the initial image with a low-pass filter, preferably Gaussian shaped, and then storing the resulting image in an array with increased dynamic range. All successive processing is performed on the images stored with increased dynamic range.

The technique can employ any parametric motion model. It is particularly suited to be used in:

1) a translational motion model, that is:

$$dx = a_1$$

$$dy = a_2$$

2) a four-parameter motion model, that is:

$$dx = a_1 x - a_2 y + a_3$$

$$dy = a_2 x + a_1 y + a_4$$

3) an affine motion model, that is:

$$dx = a_1 x + a_2 y + a_3$$

$$dy = a_4 x + a_5 y + a_6$$

Where dx, dy are the components of the displacement vector d=(dx, dy) for a pixel at location (x, y), and where a=($a_1$. . . $a_6$) are the motion parameters.

DESCRIPTION OF THE FIGURES

The present invention will now be described in more detail by way of a non-limiting embodiment, and with reference to the accompanying drawings, in which:

FIGS. 5a–5d show the operation of a parameter space memory, and the decision mechanism.

FIG. 6 shows an example how the resolutions in the image and parameter space are changed.

FIG. 7 is an example of the value of k's for various combinations of resolutions.

DESCRIPTION OF A PREFERRED EMBODIMENT

Figure 1:
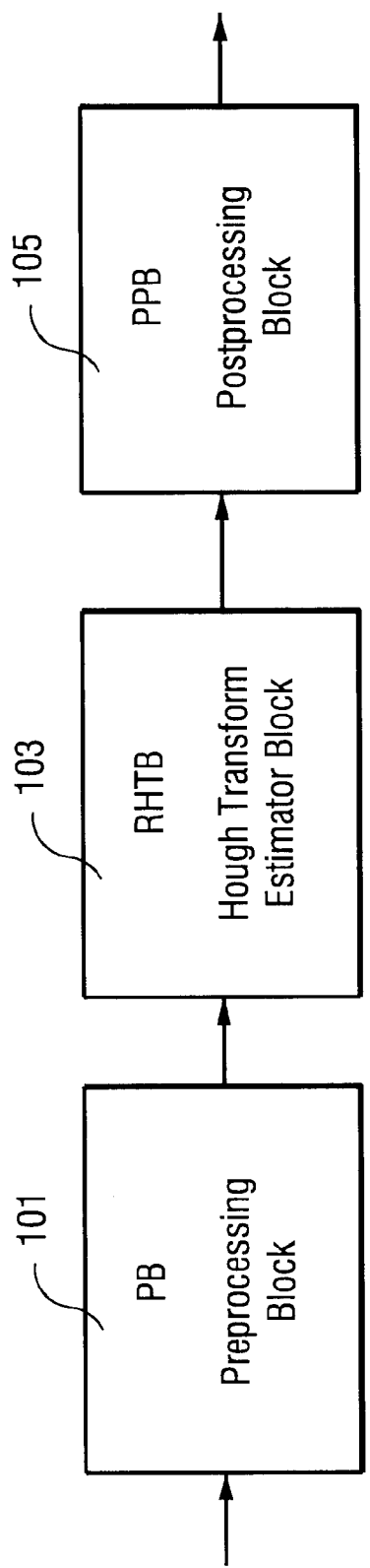
FIG. 1 is a general block diagram.

FIG. 1 depicts a general block diagram of the technique. It consists of three main processing blocks to which consecutive images are fed:

a Preprocessing Block (PB) 101, a Robust Hough Transform Block (RHTB) 103, and a Postprocesing Block (PPB) 105

The steps involved in these processing blocks will be explained in more detail below.

Figure 2:
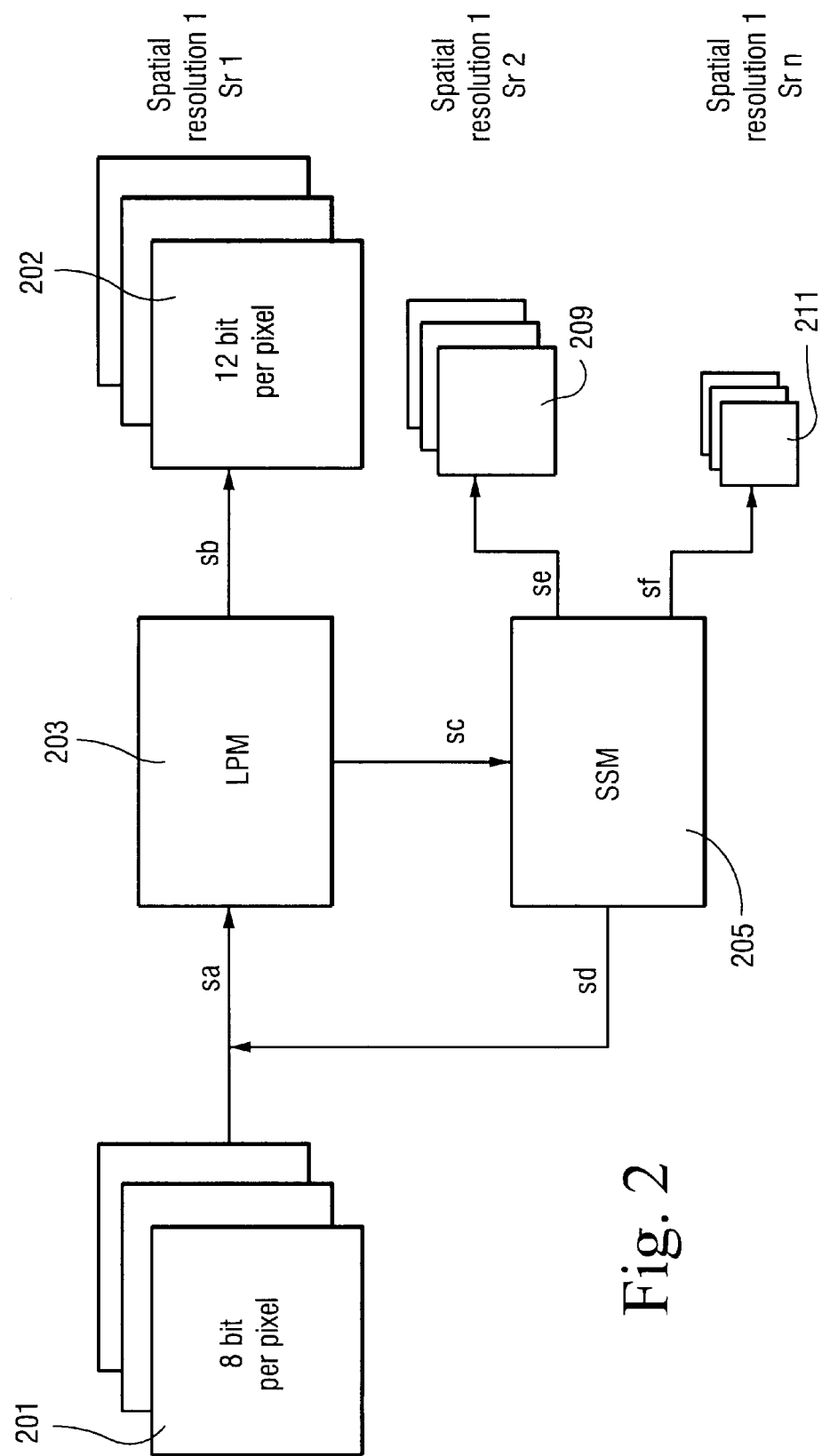
FIG. 2 shows the steps involved in the proprocessing block of FIG. 1.

FIG. 2 illustrates the steps carried out in the preprocessing block 101. Firstly, several consecutive digitized images 201 are low-pass filtered by a low-pass filtering module (LPM) 203, where the filter used preferably is Gaussian shaped, and the result is stored with increased dynamic resolution.

Thus, the LPM 203 performs low-pass filtering (smoothing) of the images. For example, the images are convolved with two separable 3 tap filters having the coefficients {¼, ½, ¼} in the x and y directions. The number of times the image passes the filter depends on the image resolution, for example 2 passes for QCIF and three passes for a CIF resolution can be used. If the input image is integer valued and represented by 8 bpp, the output image from the low-pass filter is float valued, due to the fact that the filter coefficients are float valued.

For example, the input image grey-levels are stored as 8 bits as in the case shown by FIG. 2, i.e. dynamic range 0–255, then the low-pass filtered image is stored as a 12 bits image, i.e. an image having 12 bpp, in a memory 207, whereby the information of the float values of the float valued output image can be used in the further processing.

Secondly, a Gaussian pyramid formed by images subsampled to different spatial resolutions (Srn, . . . , Sr2, Sr1) is constructed, where Sr1 is the original spatial resolution. This is performed by recursive filtering in the LPM module 203 and subsampling of each of the images in the subsampling module (SSM) 205. The results of the subsampling (se, sf), i.e. the subsampled versions at different spatial resolutions (Sr2, . . . , Srn) of the original images are stored in corresponding memories. Thus, as illustrated in the figure, first the low-pass filtered image (sc) is subsampled in the SSM module 205. The result (se) is stored in a memory 209. The subsampled image (sd) is also fed back to the LPM module 203 and low-pass filtered again, subsampled and stored in a memory 211. The process can then continue in this manner until a desired number of resolutions is obtained.

A Gaussian pyramid is constructed by recursively subsampling the low-pass filtered image by a factor of 1, both horizontally and vertically, i.e. the value of a certain pixel within a 1×1 block is selected to represent the entire 1×1 block. The process of filtering and subsampling is performed (n−1) times, where n is the number of resolutions in the pyramid. Any pixel from the 1×1 block can be chosen to represent the subimage at different degrees of resolution. However, the choice should be consistent, e.g. the upper left pixel can be chosen.

The number of spatial resolutions used (n) depends on the initial resolution of the image and the expected range of motion. For example, for the Common Interchange Format (CIF) image size two resolutions could be used (n=2), and a subsampling factor equal to four (l=4).

Figure 3:
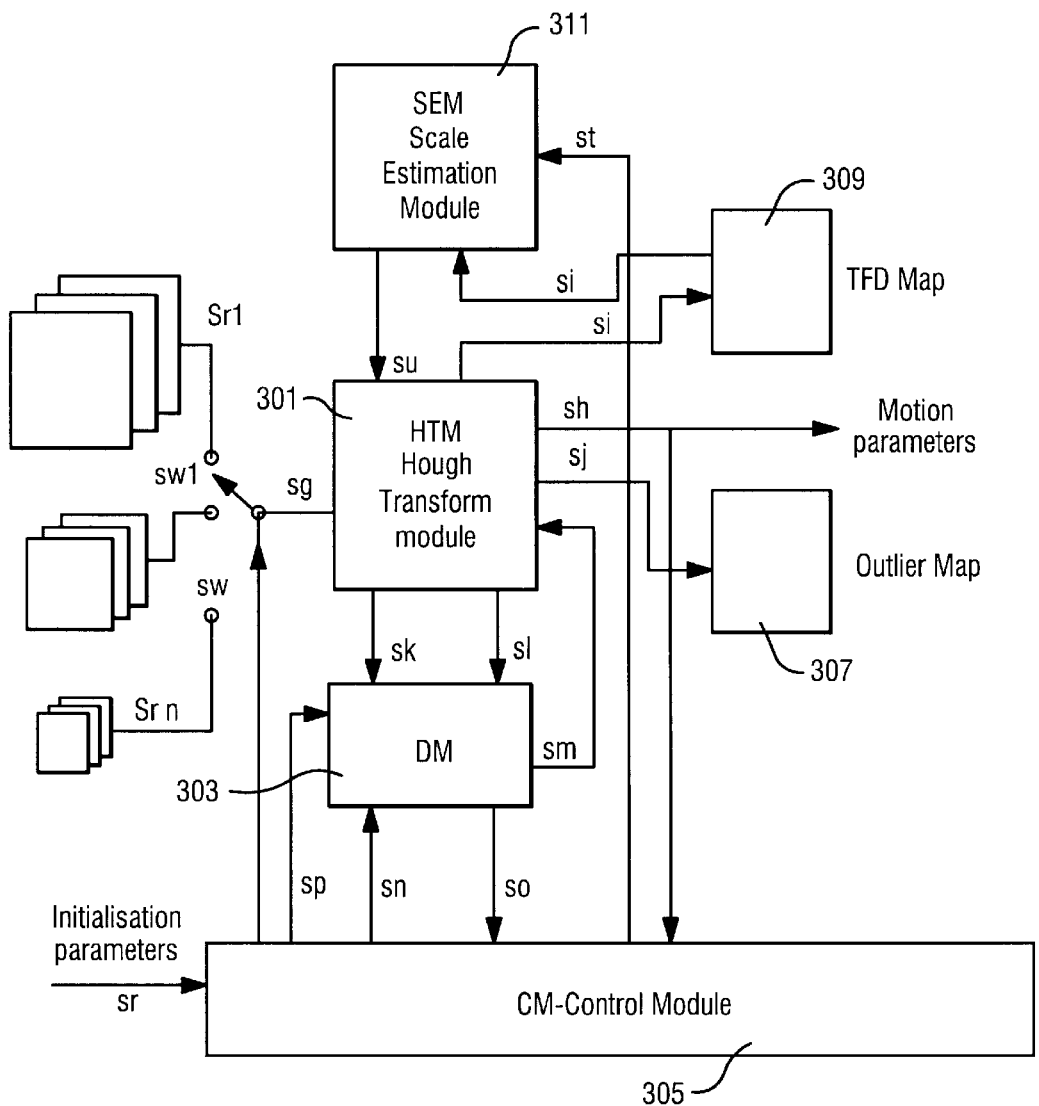
FIG. 3 shows the Robust Hough Transform Block of FIG. 1 in more detail.
Figure 4A:
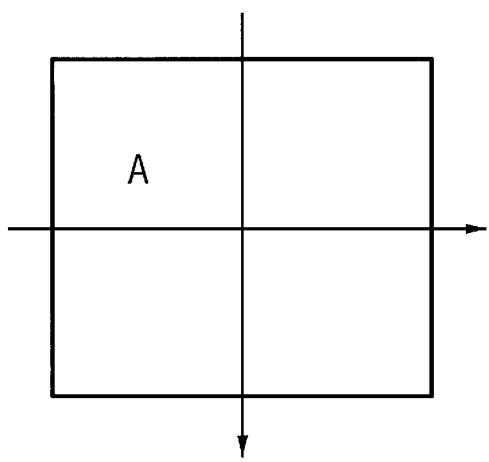
FIGS. 4a and 4b show different segmentations of an image and the position of the coordinate system.
Figure 4B:
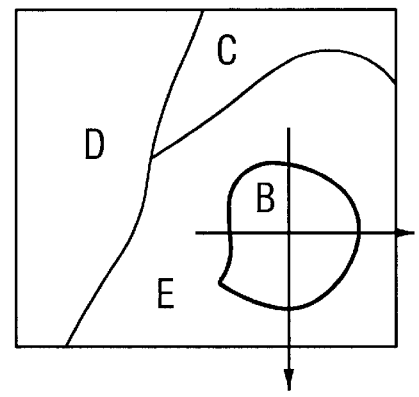
Figure 8:
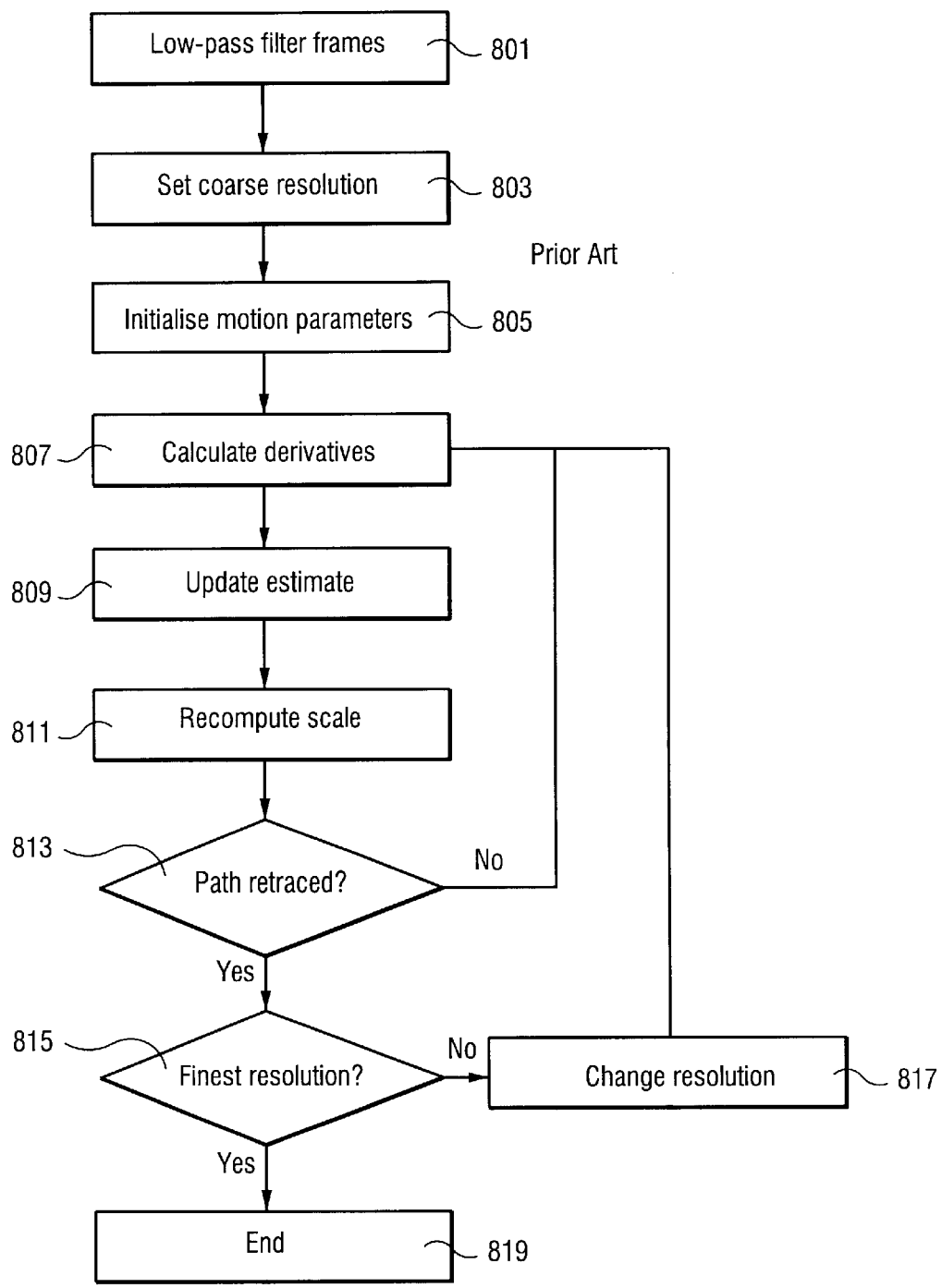
FIG. 8 is a general flow diagram of the prior art technique.

Motion estimation and segmentation take place in the Robust Hough Transform Block (RHTB), which is illustrated in FIG. 3. The following procedure can be applied either to the entire image, see FIG. 4a, or to several regions of arbitrary shape (A,B,C, . . . ) one at a time, as shown in FIG. 4b. The initial segmentation into regions can be based on image intensity (colours) or motion based segmentation calculated by the RHT technique from previous frames can be used. The Robust Hough Transform Block 103 comprises a Hough Transform Module (HTM) 301, a Decision Module (DM) 303, a Control Module (CM) 305 and a Scale Estimation Module (SEM) 311.

The control module 305 has an overall control of the estimation process and performs the following tasks:
  Selection of the initial values of the parameters used in the estimation process, namely the spatial resolution of the images (Sr) and the initialisation value for motion parameters (Sp). The initial spatial resolution is set by means of the switch sw1 controlled by the CM module 305 via a signal on the line (sw). Depending on which spatial resolution is set by the CM module 305 the images corresponding to that particular spatial resolution (Sr) are fed to the HTM module 301 on the line (sg). The initialisation value for motion parameters is sent to the DM 303 on a line (sp).
  Changes to the spatial resolution of images used for estimation during the iterative process. Once the estimation at spatial resolution (sr) is completed, which is detected by the DM module 303, a signal from the DM 303 is issued on the line (so) to the CM module. The CM module 305 then checks for a termination condition. If a condition is fulfilled, the estimation process is completed. Otherwise, images at a finer spatial resolution are selected by means of signalling on the line (sw) to the switch sw1, and the process then continues.
  Deciding when the estimate of scale (su) should be updated and informing the SEM module 311 via signal (st) to recalculate the scale. The CM module 305 counts the number of iterations, each iteration is signalled via line (so) from the DM module 303, and compares the count with a threshold, which is depending on both the current spatial resolution (Sr) and the current parameter resolution (Pr).

The decision at which spatial resolution the estimation should start depends on whether any a priori information on motion of the region is available.

The estimation usually starts at a coarse or medium spatial resolution, i.e. at resolution Srn, where n>1, unless a motion parameter initialisation value (sr) is available. The initialisation value sr may be based on the estimate from a neighbouring block or region, or other motion estimator may be used to obtain a coarse estimate of motion. When initialisation is available, the estimation may start at the coarsest (Srn), medium (Sr (n−1), . . . , Sr2) or finest spatial resolution (Sr1).

The DM module 303 performs two tasks:
1) it selects the resolution in the parameter space (Pr), and
2) it controls the iterative process by updating the values of motion parameters and detecting the termination condition.

The HTM module 301 computes the value of support (sk) as described in M. Bober and J. Kittler, "Robust Motion Analysis", in the CVPR Conference proceedings, 1994, pages 947–952, and the derivatives (s1) of the support surface (Hough surface) for a given value of motion parameters (sm), which are provided by the Decision Module (DM) 303. Values of support (sk) and derivatives (s1), which preferably are scaled according to the paragraphs below, are passed back to the Decision Module DM 303 for analysis. The DM module updates the estimate of value of the motion parameters (sm) and detects the termination condition which is signalled on the line (so) to the CM module 305.

The motion analysis usually starts on a coarse resolution in the parameter space (Pr). The motion parameters (sm) are initially set to either no-motion case or to some initialisation value (sp). The DM module 303 decides on the update of the motion parameters, i.e. the next position in the parameter space as illustrated by FIG. 5c. This decision is based on the value of the partial derivatives $dH_i$ on line (s1) calculated by the HTM module 301 as:

$$dH_i = \partial H(\Re, a)/\partial a_i$$

The values of each partial derivatives $dH_i$ is scaled by means of factors, which are dependent on the spatial extension of a current region, and in a preferred embodiment factors, $t_1$, $t_2$, $t_3$, $t_4$ and $t_5$, computed as follows are used in the different models as described below.

$$t_1 = \Sigma_{(p \in pullout; zu308800.001)} |x+y|; \quad t_2 = \Sigma_{(p \in pullout; zu308800.001)} |x-y|;$$
$$t_3 = \Sigma_{(p \in pullout; zu308800.001)} 1; \quad t_4 = \Sigma_{(p \in pullout; zu308800.001)} |x|;$$
$$t_5 = \Sigma_{(p \in pullout; zu308800.001)} |y|$$

where $\Re$ is a set of all pixels included in the estimation, that is all pixels, p=(x, y), from a region except outliers, and x and y being the pixel location in the x and y directions of a coordinate system. The scaled derivatives $dHN_i$ are then computed as follows:

For the translational motion case, no scaling is performed.

For the four parameter motion model case:
$dHN_1=dH_1/t_1$; $dNH_2=dH_2/t_2$; $dHN_3=dH_3/t_3$ $dHN_4=dH_4/t_3$ and for the affine motion model:
$dHN_1=dH_1/t_4$; $dHN_2=dH_2/t_5$; $dHN_3=dH_3/t_3$ $dHN_4=dH_4/t_4$; $dHN_5=dH_5/t_5$; $dHN_6=dH_6/t_3$ By performing the scaling of the partial derivatives in the manner shown above, a much faster and more reliable convergence is obtained.

This is due to the fact that if un-scaled derivatives are used, the search tend to favour (be more sensitive to) certain parameters, i.e. $a_1$, $a_2$ for the four parameter motion model and $a_1$, $a_2$, $a_4$, and $a_5$ for the affine model. These parameters are over-compensated, i.e. they are changed very often and the search routine has to perform many iterations in order to return to the optimal values.

There is also an alternative scaling procedure which has been proved to produce good results and which is more computationally efficient. In this alternative procedure each partial derivative $dH_i$ is scaled by a factor corresponding to the current resolution in the parameter space, in particular a multiplication with the current resolution $r_i$ in the parameter space for the corresponding parameter $a_i$.

$$dHN_i=dH_i*r_i$$

Such scaling is then performed instead of the above described scaling with the factors $t_1$–$t_5$.

The scaled partial derivatives form a gradient vector $vd=(dHN_1, \ldots, dHN_j)$ in the parameter space, see FIG. 5c. There are 3 possible decisions on update in each component of motion vector. These decisions are: increase, no change or decrease the value of a component. Thus, there are $3^N-1$ possible directions, N being the number of motion model parameters, since there must be at least one change. For example for the translational motion model (N=2) there are 8 possible decisions.

A set of basis vectors $\{b^1, \ldots, b^s\}$, where s=3N-1, is constructed, each vector being associated with one possible direction. Each vector $b^i=(b_1^i, \ldots, b_N^i)$, where N=2 for the translational motion model, N=4 for the four parameter motion model and N=6 for the affine model, is constructed as follows. The component $b_1^i$ has a value of −1, 0, or 1 depending on whether the decision involves decrease, no change, or increase in the corresponding component of the motion vector $a=(a_1, \ldots,)$. Each vector $b^i$ is then normalised so that the norm equals 1. FIG. 5d shows all vectors $b^i$ for the translational motion model. For example, for the four parameter motion model and the following decision: [$a_1$—no change, $a_2$—increase, $a_3$—decrease $a_4$—no change], the corresponding vector $b^i=w*(0, 1, -1, 0)$ where $$w=1/\text{sqrt } (0^2+1^2+(-1)^2+0^2)$$

In each iteration the best decision is selected, that is the one which maximises the scalar product of vd and $b^i$, i.e. maximises the following expression:

$$M^i=vd \cdot b^i$$

The HTM module 301 also provides an Outlier Map 307 and a Transformed Frame Difference Map (TFD) 309. The values of the TFD Map 309 (si) are passed to the SEM module 311, which calculates a scale of residual errors (su), if requested by the CM module 305. The scale of the residual errors does not have to be recomputed after each iteration step. By calculating and updating the value of the scale every k steps, where k is an integer greater than one, the computation complexity can be reduced. The value of the parameter k depends on the resolution in the parameter space and suitable values for k are shown on FIG. 7, and will be further discussed below.

Also, in order to improve the speed and convergence, a hybrid scheme where the initial estimate at coarse resolution is determined by a non-iterative technique, such as the phase-based technique, can be used. That is, first at the low, coarse resolution stage a fast non-iterative technique is used. Then, at the medium or finest resolution stages the modified Hough Transform using Robust Statistical Kernels is used.

The Segmentation Map, i.e. the Outlier Map 307 is a binary image with a symbol, indicating if the pixel is considered to be an inlier or outlier, attached to each pixel.

Whether a pixel is an inlier or an outlier depends on the value of the TFD map 309 for that pixel and the current value of the scale estimate (su). The TFD map is a float valued image with the transformed frame difference for each pixel calculated for the current value of motion parameters (sm).

In order to determine if a pixel is an outlier, the following operations are performed in a preferred embodiment. The absolute value (abs) of the TFD value for a given pixel is compared to the current value of the scale estimate. If abs(TFD-value) is greater than 3 * the scale estimate (sca), where sca is defined below, the point is considered an outlier, else it is considered to be an inlier.

A Parameter Space Memory, which is a part of the DM module, records all positions visited in the parameter space and the corresponding support. Each new position in the parameter space is checked against this list, shown in FIG. 5b. If this position has already been visited, i.e. the positions for which calculations have been made, see positions s3, s7 in FIG. 5a, this fact is detected by the decision module, and a change of the resolution in parameter space follows, i.e. to a finer resolution.

Estimation continues at a finer resolution, starting from a position with the greater support, that is position s5 in the case shown. The starting position has been shown to be very important for the performance of the technique and by using the point having the greatest support as a starting point the performance is increased. The CM module 305 decides whether to continue motion estimation on a sequence with finer spatial resolution Sr. Once the finest resolution is reached, this fact is signalled to the control module 305 (CM) via a signal (so). The process is terminated if one of the following criteria is fulfilled:

the processing on the finest spatial resolution Sr1 is completed, or if the number of iterations on the fine resolution exceeds the iteration threshold, or if the value of the median estimate of scale as defined hereinafter is below the scale threshold.

For example, the values of the thresholds can be selected as:

| Iteration threshold | 200 iterations |
|---|---|
| Scale threshold | 0.35 grey-level | where 0 denotes black and 255 denotes white in the grey-scale.

If continuation is selected, motion parameters from the coarser spatial resolution are transformed to the finer resolution and used as initialisation parameters (sp).

The optimisation search for the maximum in the parameter space is performed iteratively, and during the optimisation process motion parameters can only take discrete values. Such an optimisation process is herein referred to as an optimisation on a discrete grid. The coarseness of the discrete grid, i.e. the resolution in the parameter space, can be different for different motion parameters. The maximum displacement of an object, object size and the resolution in the parameter space should preferably be related as explained in the following paragraph.

The following tables show the preferred values for the different parameters, which have been found to provide good convergence, for a translational, four parameter motion model and affine motion model.

| Translational motion model: | | |
|---|---|---|
| Resolution | a1 | a2 |
| Coarse | d/8 | d/8 |
| Medium | d/48 | d/48 |
| Fine | d/384 | d/384 |
| Four parameter motion model: | | |
| Resolution | a1 and a2 | a3 and a4 |
| Coarse | a3/M | d/8 |
| Medium | a3/M | d/48 |
| Fine | a3/M | d/384 |
| Affine motion model: | | |
| Resolution | a1, a2 a4, a5 | a3 and a6 |
| Coarse | a3/M | d/8 |
| Medium | a3/M | d/48 |
| Fine | a3/M | d/384 | where d [pixels] is the displacement, i.e. the maximum translation for any pixel from the region, or maximum expected pixel displacement, for example most coding techniques limit such displacement to 16 pixels for CIP images, and M [pixels] is the average pixel distance from the centre of the coordinate system calculated for all pixels within a region. An example how the resolutions in the image (Srn) and parameter space (Prn) are changed is shown in FIG. 6. This example assumes the translational motion model, with two spatial resolutions Sr1—original resolution, and Sr2—the original image subsampled by four.

In the example there are four resolutions in the parameter space: Pr1 equal to 1.25, Pr2 equal to 0.25, Pr3 equal to 0.05 and Pr4 equal to 0.01. The estimation starts at coarse resolutions both in the image space (Sr2) and in the parameter Space (Pr1), shown at position 1 on the graph. In the next step, the resolution in the parameter space is increased to 0.25 (Pr2), shown at position 2. Since this is the finest resolution in the parameter space for this spatial resolution (Sr2), the estimation at this spatial resolution is completed. This fact is signalled on line (so) to the Control Module CM 305 which decides whether to continue the estimation on a finer resolution in the image space. In the example the estimation process continues at spatial resolution Sr1, positions 3, 4 and 5, after the CM module 305 has signalled to the switch sw1 via the line (sw) that the spatial resolution Sr1 now is to be fed to the HTM module 301.

The SEM module 311 recomputes the scale of residual errors at each request on the request line (st) from the Decision Module 303. The scale can be updated after every iteration or each k iterations, where k can vary depending on the spatial and parameter resolution. The estimate of scale, i.e. the scale of residual errors, is calculated as the Median Absolute Deviation (MAD) as defined in M. Bober and J. Kittler, "Robust Motion Analysis", in the CVPR Conference proceedings, 1994, pages 947–952, and increased by a constant C, i.e.: scale estimate: sca=1.48 * median($|\epsilon(d_i)-$median$(\epsilon(d_i))|$)+C The value of the constant C is preferably 0.3, which by means of experiments has been found to be a suitable value. The maximum value of the scale estimate is usually around 10, but can theoretically be more, when the estimation starts and has a lower limit at C, which in this example is equal to 0.3.

FIG. 7 illustrates an example of the values of k's for various combinations of the resolutions in the image space Sr and in the parameter space Pr. The estimate of scale is returned to the HTM module, through the signal (su).

Once the estimation is terminated by the CM module 305, the estimator in the HTM module 301 outputs the motion parameters (sh) and the Outlier map (sj). The outlier map is analyzed for large spatially coherent region(s) of outliers. The presence of such regions signals multiple motions. If motion of such remaining regions is of interest, the estimation process can be restarted solely for these remaining region(s). The analysis for large spatially coherent region(s) is performed by means of majority filtering, which works in the following manner:

First a window size is chosen, in the preferred case a window size of 3×3 or 5×5 is chosen.

Then this window is centred around each pixel in the image and the number of outliers within the window is counted.

If the number of outliers is greater than half of the number of pixels in the window, i.e. greater than 4 or 12 for the 3×3 or 5×5 window, respectively, then the considered pixel is determined to be an outlier and is labelled accordingly.

Else the pixel is labelled inlier.

The inlier region is usually the largest one and the estimated motion parameters correspond to its motion.

Finally, it has been found that the framework as described herein is not limited to block shaped regions, but can be extended to regions of any shape. However, in the latter case, the placement of the centre of the coordinate system has turned out to be crucial for the performance of the technique. It has been found that by using the centre of gravity of the reference region as the origin of the coordinate system, good performance is obtained.

In the technique, the optimisation procedure becomes very fast. This is due to the fact that an exhaustive search, which is used for instance by Block Matching techniques, is avoided. The proposed modifications improve speed and convergence of the technique. The accuracy of the final estimate is also improved. Some of the changes make real time implementation feasible. The technique described herein has a broad use in the image compression and coding domain.

What is claimed is:

1. A Hough transform based method of estimating N parameters a=($a_1, \ldots, a_N$) of motion of a region Y in a first image to a following image, the first and following images represented, in a first spatial resolution, by intensities at pixels having coordinates in a coordinate system, the method comprising the steps of:

determining the total support H(Y,a) as a sum of the values of an error function for the intensities at pixels in the region Y, determining the motion parameters a that give the total support a minimum value using a Hough transform, the determining being made in steps of an iterative process moving along a series of parameter estimates $a_1, a_2, \ldots$ by calculating partial derivatives $dH_i = MH(Y, a_n)/Ma_{n,i}$ of the total support for a parameter estimate $a_n$ with respect to each of the parameters $a_1$ and evaluating the calculated partial derivatives for taking a new $a_{n+1}$, wherein, in the evaluating of the partial derivatives, the partial derivatives $dH_i$ are first sealed by multiplying by scaling factors dependent on the spatial extension of the region to produce sealed partial derivatives $dHN_i$.

2. The method of claim 1, wherein for a four-parameter motion model according to:

$$dx = a_1 x - a_{2Yi\ y+a3}$$

$$dy = a_2 x + a_1 y + a_4$$

where dx, dy are components of a displacement vector d=(dx,dy) for apixel at a location (x, y), the scaled partial derivatives are calculated as follows:

$$dHN_1 = dH_1/t_1;\ dHN_2 = dH_2/t_2$$

$$dHN_3 = dH_3/t_3;\ dHN_4 = dHN_4 = dH_4/t_3$$

where the factors $t_1$–$t_3$ are computed as follows:

$$t_1 = \phi_{(pOY)} * x + y *;\ t_2 = \phi_{(pOY)} \cdot x - y *;\ t_3 = \phi_{(POY)} 1;$$

where Y is a set of all pixels in the region Y.

3. The method of claim 1, wherein for an affine motion model according to:

$$dx = a_1 x + a_2 y + a_3$$

$$dy = a_4 x + a_5 y + a_6$$

where dx, dy are components of a displacement vector d=(dx,dy) for a pixel at a location (x, y), the scaled partial derivatives are calculated as follows:

$$dHN_1 = dH_1/t_4;\ dHN_2 = dH_2/t_5;\ dHN_3 = dH_3/t_3$$

$$dHN_4 = dH_4/t_4;\ dHN_5 = dH_5/t_5;\ dHN_5 = dH_6/t_3$$

where the factors $t_3$–$t_5$ are computed as follows:

$$t_3 = \phi_{(pOY)} 1;\ t_4 = \phi_{(pOY)} * x *;\ t_5 = \phi_{(pOY)} \cdot y.$$

where Y is a set of all pixels included in the region Y.

4. The method of claim 1 comprising the additional step of selecting a resolution $r_i$ in the parameter space for each of the parameters $a_i$, the selected resolution giving a grid of points in the N-dimensional space of possible parameter values, and in the step of determining the motion parameters a that give the total support a minimum value, each parameter estimate taken to be a point in the grid.

5. The method of claim 4, wherein, in the evaluating of the partial derivatives, a gradient vector $vd = (dHN_1, \ldots, dHN_N)$ of the scaled partial derivatives for the parameter estimate $a_n$ is formed and is multiplied by normalized vectors $b^1, \ldots, b^2$ to form quantities $M^i = vd \times b^i$, the normalized vectors obtained by normalizing vectors extending in the N-dimensional parameter space from the parameter estimate $a_n$ to all neighbouring points in the grid, and the neighbouring point having the maximum vale of said quantities is taken to be the next parameter estimate $a_{n+1}$.

6. The method of claim 4, wherein, after the step of determining the motion parameters a that give the total support a minimum value, a finer resolution $r_i$ in the parameter space for each of the parameters $a_i$ of motion is selected, and thereafter the step of determining the motion parameters a that give the total support a minimum value is executed again for the finer resolution and the grid of points given thereby.

7. The method of claim 4, wherein, after making each of the steps of the iterative process, the resolutions $r_i$ are set to values smaller than the values used in the step until the resolutions, in the setting thereof, have achieved predetermined values, and in the following steps the resolutions $r_i$ being set to smaller values only after every k steps, where k is an integer <1.

8. The method of claim 4, wherein in steps of the iterative process, a median estimate of scale is calculated for use in the step of determining the total support, the median estimate of scale calculated in every k:th step of the iterative process, k being an integer $\geq 1$, k being dependent on a current spatial resolution of the pixels and the current parameter resolutions $r_i$.

9. The method of claim 4, wherein in the step of selecting resolutions $r_i$ in the parameter space, the resolutions are selected to have a relation to an expected maximum value of displacement of pixels from the region Y in the first image to the following image and to the size of the region.

10. The method of claim 9, comprising the additional steps of:

after the step of determining a parameter estimate, selecting a second spatial resolution in which the first and following images are represented by the pixels, and then again executing the steps of determining the total support and of determining the motion parameters, wherein the relation of the resolutions in the parameter space is preserved in the steps that are again executed.

11. The method of claim 1 comprising the additional steps of:

selecting a resolution $r_i$ in the parameter space for each of the parameters $a_i$, the selected resolution giving a grid of points in the N-dimensional space of possible parameter values, and determining, before determining the motion parameters a in an iterative process, parameter estimates of the motion parameters a in a non-iterative process, each parameter estimate taken to be a point in the grid, thereafter setting the resolutions $r_i$ to values smaller than the values used in the previous step of determining, in the step of determining the motion parameters a in the iterative process, each parameter estimate being taken to be a point in the grid.

12. The method of claim 1, wherein the iterative process is stopped when the number of steps in the iterative process exceeds an iteration threshold.

13. The method of claim 4, wherein the iterative process is stopped when the number of steps in the iterative process exceeds an iteration threshold dependent on a current spatial resolution of the pixels and the current resolutions $r_i$ of the parameters.

14. The method of claim 1, wherein in steps of the iterative process, a median estimate of scale is calculated for use in the step of determining the total support, the iterative process stopped when the value of the median estimate of scale is below a scale threshold.

15. The method of claim 14, wherein the median estimate of scale is calculated in every step of the iteration process or in every k:th step of the iterative process, k being an integer <1.

16. The method of claim 1, wherein the iterative process is stopped when in the iterative process the same steps as before are taken.

17. The method of claim 1, wherein in steps of the iterative process, a median estimate of scale is calculated for use in the step of determining the total support, the median estimate of scale being calculated as a median absolute derivation (MAD) robust estimate of scale to which a positive constant is added.

18. The method of claim 17, wherein the positive constant is equal to 0.3.

19. The method of claim 1, wherein the region Y has an arbitrary shape, a centre of the coordinate system for the pixels being chosen as the centre of gravity of the region.

20. The method of claim 1, comprising the additional step of first prefiltering the first and following images by a low-pass filter giving the prefiltered first and following images a dynamic range that is larger than the dynamic range of the first and following images, using the prefiltered first and following images in the steps of determining the total support and of determining the motion parameters.

21. The method of claim 20, wherein, in the step of first prefiltering, the first and following images are filtered using a Gaussian shape filter.

22. A Hough transform based method of estimating N parameters $a=(a_i, \ldots, a_N)$ of motion of a region Y in a first image to a following image, the first and following images represented, in a first spatial resolution, by intensities at pixels having coordinates in a coordinate system, the method comprising the steps of:

determining the total support $H(Y,a)$ as a sum of the values of an error function for the intensities at pixels in the region Y, selecting a resolution $r_i$ in the parameter space for each of the parameters $a_i$ of motion, the selected resolution giving a grid of points in the N-dimensional space of possible parameter values, determining the parameters a that give the total support a minimum value, the determining being made in steps of an iterative process moving along a series of parameter estimates $a_1, a_2, \ldots$, each parameter estimate being a point in the grid, wherein after making each of the steps of the iterative process, the resolutions $r_i$ are set to values smaller than the values used in the step until the resolutions, in the setting thereof, have achieved pre-determined values, and in the following steps the resolution $r_i$ are set to smaller values only after every k:th step, where k is an integer <1.

23. A Hough transform based method of estimating N parameters $a=(a_1, \ldots, a_N)$ of motion o a region Y in a first image to a following image, the first and following images represented, i a first spatial resolution, by intensities at pixels having coordinates in a coordinate system, the method comprising the steps of:

selecting a resolution $r_i$ in the parameter space for each of the parameters $a_i$ of motion, the selected resolution giving a grid of points in the N-dimensional space of possible parameter values, determining parameter estimates of the motion parameters a in a non-iterative process, each parameter estimate taken to a point in the grid, thereafter setting the resolution $r_i$ to values smaller than the values used in the previous step, determining the total support $N(Y,a)$ as a sum of the values of an error function for the intensities at pixels in the region Y, determining the parameters a that give the total support a minimum value, the determining being made in steps of an iterative process moving along a series of parameter estimates $a_1, a_2, \ldots$, each parameter estimate being a point in the grid.

24. A Hough transform based method of estimating N parameters $a=(a_1, \ldots, a_N)$ of motion of a region Y in a first image to a following image, the first and following images represented, in a first spatial resolution, by intensities at pixels having coordinates in a coordinate system, the method comprising the steps of;

determining the total support $H(Y,a)$ as a sum of the values of an error function for the intensities at pixels in the region Y, selecting a resolution $r_i$ in the parameters pace for each of the parameters $a_i$ of motion, the selected resolution giving a grid of pints in the N-dimensional space of possible parameter values, determining the parameters a that give the total support a minimum value, the determining being made in steps of an iterative process moving along a series of parameter estimates $a_1, a_2, \ldots$, each parameter estimate being a point in the grid, wherein the iterative process is stopped is stopped when the number of steps made in the iterative process exceeds an iteration threshold.

25. The method of claim 24, wherein the iteration threshold is selected to be dependent on a current spatial resolution of the pixels and the current resolutions $r_i$ of the parameters.

26. A Hough transform based method of estimating N parameters $a=(a_i, \ldots a_N)$ of motion of a region Y in a first image to a following image, the first and following images represented, in a first spatial resolution, by intensities at pixels having coordinates in a coordinate system, the method comprising the steps of:

determining the total support $H(Y,a)$ as a sum of the values of an error function for the intensities at pixels in the region Y, selecting a resolution $r_i$ in the parameter space for each of the parameters $a_i$ of motion, the selected resolution giving a grid of points in the N-dimensional space of possible parameter values, determining the parameters a that give the total support a minimum value, the determining being made in steps of an iterative process moving along a series of parameter estimates $a_i, a_2, \ldots$, each parameter estimate being a point in the grid, wherein in steps of the iterative process, a medium estimate of scale is calculated for use in the step of determining the total support, the iterative process stopped when the value of the medium estimate of scale is below a scale threshold.

27. The method of claim 26, wherein the median estimate of scale is calculated in every step of the iteration process or in every k:th step of the iterative process, k being an integer <1.

28. A Hough transform based method of estimating N parameters $a=(a_1, \ldots, a_N)$ of motion of a region Y in a first image to a following image, the first and following images represented, in a first spatial resolution, by intensities at pixels having coordinates in a coordinate system, the method comprising the steps of:

determining the total support $H(Y,a)$ as a sum of the values of an error function for the intensities at pixels in the region Y, selecting a resolution $r_i$ in the parameter space for each of the parameters $a_i$ of motion, the selected resolution giving a grid of points in the N-dimensional space of possible parameter values, determining the parameters a that give the total support a minimum value, the determining being made in steps of an iterative process moving along a series of parameter estimates $a_1, a_2, \ldots$, each parameter estimate being a point in the grid, wherein in steps of the iterative process, a median estimate of scale is calculated for use in the step of determining the total support, the median estimate of scale calculated in every k:th step of the iterative process, k being an integer $\geq 1$, k being dependent on a current spatial resolution of the pixels and the current parameter resolutions $t_i$.

29. A Hough transform based method of estimating N parameters $a=(a_1, \ldots, a_N)$ of motion of a region Y in a first image to a following image, the first and following images represented, in a first spatial resolution, by intensities at pixels having coordinates in a coordinate system, the method comprising the steps of:

determining the total support H(Y,a) as a sum of the values of an error function for the intensities at pixels in the region Y, selecting a resolution $r_1$ in the parameter space for each of the parameters $a_1$ of motion, the selected resolution giving a grid of points in the N-dimensional space of possible parameter values, determining the parameters a that give the total support a minimum value, the determining being made in steps of an iterative process moving along a series of parameter estimates $a_1, a_2, \ldots$, each parameter estimate being a point in the grid, wherein the iterative process is stopped when in the iterative process the same steps as before are taken.

30. A Hough transform based method of estimating N parameters $a=(a_1, \ldots, a_N)$ of motion of a region Y in a first image to a following image, the first and following images represented, in a first spatial resolution, by intensities at pixels having coordinates in a coordinate system, the method comprising the steps of:

determining the total support H(Y,a) as a sum of the values of an error function for the intensities at pixels in the region Y, selecting a resolution $r_i$ in the parameter space for each of the parameters $a_i$ of motion, the selected resolution giving a grid of points in the N-dimensional space of possible parameter values, determining the parameters a that give the total support a minimum value, the determining being made in steps of an iterative process moving along a series of parameter estimates $a_1, a_2, \ldots$, each parameter estimate being a point in the grid, wherein in steps of the iterative process, a median estimate of scale is calculated for use in the step of determining the total support, the median estimate of scale being calculated as a median absolute deviation (MAD) robust estimate of scale to which a positive constant is added.

31. The method of claim 30, wherein the positive constant is equal to 0.3.

32. A Hough transform based method of estimating N parameters $a=(a_1, \ldots, a_N)$ of motion of a region Y in a first image of a following image, the first and following images represented, in a first spatial resolution, by intensities at pixels having coordinates in a coordinate system, the method comprising the steps of:

determining the total support H(Y,a) as a sum of the values of an error function for the intensities at pixels in the region Y, selecting a resolution $r_i$ in the parameter space for each of the parameters $a_i$ of motion, the selected resolution giving a grid of points in the N-dimensional space of possible parameter values, determining the parameters a that give the total support a minimum value, the determining being made in steps of an iterative process moving along a series of parameter estimates $a_1, a_2, \ldots$, each parameter estimate being a point in the grid, wherein a centre of the coordinate system for the pixels is chosen as the centre of gravity of the region.

33. A Hough transform based method of estimating N parameters $a=(a_1, \ldots, a_N)$ of motion of a region Y in a first image to a following image, the first and following images represented, in a first spatial resolution, by intensities at pixels having coordinates in a coordinate system, the method comprising the steps of:

determining the total support H(Y,a) as a sum of the values of an error function for the intensities at pixels in the region Y, selecting a resolution $r_i$ in the parameter space for each of the parameters $a_i$ o motion, the selected resolution giving a grid of pints in the N-dimensional space of possible parameter values, determining the parameters a that give the total support a minimum value, the determining being made in steps of an iterative process moving along a series of parameter estimates $a_1, a_2, \ldots$, each parameter estimate being a point in the grid, wherein, in the step of selecting resolutions $r_i$ in the parameter space, the resolutions are selected to have a relation to an expected maximum value o displacement of pixels from the region Y in the first image to the following image and to the size of the region.

34. The method of claim 33, comprising the additional steps of:

after the step of determining a parameter estimate, selecting a second spatial resolution in which the first and following images are represented by the pixels, and then again executing the steps of determining the total support and of determining the motion parameters, wherein the relation of the resolutions in the parameter space is preserved in the steps that are again executed.

35. A Hough transform based method of estimating N parameters $a=(a_1, \ldots, a_N)$ of motion of a region Y in a first image to a following image, the first and following images represented, in a first spatial resolution, by intensities at pixels having coordinates in a coordinate system, the method comprising the steps of:

prefiltering the first and following images by a low-pass filter giving the prefiltered first and following images a dynamic range that is larger than the dynamic range of the first and following images, determining the total support H(Y,a) as a sum of the values of an error function for the intensities at pixels in the region Y of the prefiltered first and following images, determining the motion parameters a that give the total support a minimum value, the determining being made in steps of an iterative process moving along a series of parameter estimates $a_1, a_2, \ldots$.

36. The method of claim 35, wherein, in the step of first prefiltering, the first and following images are filtered using a Gaussian shape filter.

37. A Hough transform based method of estimating N parameters $a=(a_1, \ldots, a_N)$ of motion of a region Y in a first image to a following image, the first and following images represented, in a first spatial resolution, by intensities at pixels having coordinates in a coordinate system, the method comprising the steps of:

determining the total support H(Y,a) as a sum of the values of an error function for the intensities at pixels in the region Y, selecting a resolution $r_i$ in the parameter space for each of the parameters $a_i$ of motion, the selected resolution giving a grid of points in the N-dimensional space of possible parameter values, determining the parameters a that give the total support a minimum value, the determining being made in steps of an iterative process moving along a series of parameter estimates $a_1, a_2, \ldots$, each parameter estimate being a point in the grid, by calculating partial derivatives $dH_i=MH(Y, a_n)/Ma_{n,i}$ of the total support for a parameter estimate $a_n$ with respect to each of the parameters $a_i$ and evaluating the partial derivatives for taking new $a_{n+1}$, wherein, in the evaluating of the partial derivatives, the partial derivatives $dH_i$ are first scaled by multiplying by scaling factors $t_i$, the scaling factors having values corresponding to the resolution $r_i$ in the parameter space, so that the scaled partial derivatives are $dHN_i=dH_i \, A \, r_i$.

38. The method of claim 37, wherein, in the evaluating of the partial derivatives, a gradient vector $vd=(dHN_1, \ldots, dNH_N)$ o the scaled partial derivatives for the parameters estimate $a_n$ is formed and is multiplied by normalized vectors $b^1, \ldots, b^S$ to form quantities $M^i=vd \times b^i$, the normalized vectors obtained by normalizing vectors extending in the N-dimensional parameter space from the parameter estimate $a_n$ to all neighbouring points in the grid, and the neighbouring point having the maximum vale of said quantities is taken to be the next parameter estimate $a_{n+1}$.

39. The method of claim 37, wherein, after the step of determining the motion parameters a that give the total support a minimum value, a finer resolution $r_i$ in the parameter space for each of the parameters $a_i$ of motion is selected, and thereafter the step of determining the motion parameters a that give the total support a minimum value is executed again for the finer resolution and the grid of points given thereby.

40. A device for estimating values of N parameters $a=(a_1, \ldots, a_N)$ of motion of a region Y in a first image to a following image, the region having a spatial extension, the first and following images represented, in a first spatial resolution, by intensities at pixels having coordinates in a coordinate system, the device comprising:

first memory means for storing the intensities at the pixel in the first spatial resolution, a Hough transform module connected to the first memory means for determining total supports $H(Y,a_p)$ as a sum of values of an error function for the intensities at pixels in the region Y and for parameter values $a_p$ and for calculating partial derivatives $dH_i=MH(Y,a_p)/Ma_{p,i}$ of the total support for parameter values $a_p$ with respect to each of the parameters $a_i$, a decision module connected to the Hough transform module, the decision module determining values of the parameters a that give the total support a minimum value, the determining being made in an iterative process, the decision module executing steps, selecting in each step a parameter estimate $a_n$ in a series of parameter estimates $a_1, a_2, \ldots$, providing the selected parameter estimate to the Hough transform module and receiving therefrom the determined total supports and the calculated partial derivatives for the parameter estimate $a_n$ and evaluating the received calculated partial derivatives for selecting a new parameter estimate $a_{n+1}$ to be used in the following step, wherein the decision module in the evaluating is arranged to use scaled partial derivatives obtained from the received calculated partial derivatives $dH_i$ by multiplying them by scaling factors independent on the spatial extension of the region Y.

41. The device of claim 40, wherein for a four-parameter motion model according to:

$$dx=a_1x-a_2y+a_3$$

$$dy=a_2x+a_1y+a_4$$

where dx, dy are components of a displacement vector d=(dx,dy) representing the displacement of a pixel in the first image at coordinates x, y in the coordinate system to new coordinates in the following image, the decision module is arranged to calculate the scaled partial derivatives to be used in the evaluating as follows:

$$dHN_1=dH_1/t_1; \; dHN_2=dH_2/t_2$$

$$dHN_3=dH_3/t_3; \; dHN_4=dH_4/t_3$$

the factors $t_1$–$t_3$ computed as follows:

$$t_1=\phi_{(p0Y)}*x+y*; \; t_2=\phi_{(p0Y)}*x-y*; \; t_3=\phi_{(p0Y)}1;$$

where Y is a set of all pixels in the region Y in the first image.

42. The device of claim 40, wherein for an affine motion model according to:

$$dx=a_1x+a_2y+a_3$$

$$dy=a_4x+a_5y+a_6$$

where dx, dy are components of a displacement vector d=(dx,dy) representing the displacement of a pixel in the first image at coordinates x, y in the coordinate system to new coordinates in the following image, the decision module is arranged to calculate the scaled partial derivatives to be used in the evaluating as follows:

$$dHN_1=dH_1/t_4; \; dHN_2=dH_2/T_3; \; dHN_3=dH_3/T_3$$

$$dHN_4=dH_4/t_4; \; dHN_5=dH_5/t_5; \; dHN_6=dH_6/t_3$$

the factors $t_3$–$t_5$ computed as follows:

$$t_3=\phi_{(p0Y)}1; \; t_4=\phi_{(p0Y)}*x*; \; t_5=\phi_{(p0Y)}*y*$$

where Y is a set of all pixels included in the region Y in the first image.

43. The device of claim 40, wherein the decision module is arranged to select a resolution $r_i$ in the parameter space for each of the parameters $a_i$, the selected resolution giving a grid of points in the N-dimensional space of possible parameter values, and to select, in executing each of the steps of the iterative process, a parameter estimate as a point in the grid.

44. The device of claim 43, wherein the decision module is arranged to form, in each step of the iterative process, in the evaluating of the partial derivatives, a gradient vector vd=(dHN$_1$, ..., dHN$_N$) of the scaled partial derivatives for the parameter estimate a$_n$ selected in the step and to multiply the gradient vector by normalized vectors b$^1$, ..., b$^s$ to form quantities M$^j$=vd X b$^i$, the normalized vectors obtained by normalizing vectors extending in the N-dimensional parameter space from the parameter estimate a$_n$ to all neighbouring points in the grid, and taking the neighboring point having the maximum vale of said quantities to be the parameter estimate a$_{n+1}$ to be selected in the next step.

45. The device of claim 43, wherein the decision module is arranged to select, after having determined the parameters a that give the total support a minimum value, the resolution r$_i$ in the parameter space to a finer resolution for each of the parameters a$_i$, and to thereafter again determine the motion parameters a that give the total support a minimum value for the finer resolution, using the grid of points given thereby.

46. The device of claim 45, wherein the decision module is arranged to set, after making each of the steps of the iterative process, the resolutions r$_i$ to values smaller than the values used in the step until the resolutions, in the setting thereof, have achieved predetermined values, and in the following steps the resolutions r$_i$ being set to smaller values only after every k:th step of the iterative process, where k is an integer >1.

47. The device of claim 43, further comprising a control module connected to the decision module, the decision module arranged to signal each step of the iterative process to the control module, and the control module arranged compare the number o steps in the iterative process to an iteration threshold and to stop the iterative process when the number of steps exceeds the iteration threshold, the iteration threshold being dependent on a current spatial resolution of the pixels and the current resolution r$_i$ of the parameters.

48. The device of claim 43, further comprising a scale estimation module connected to the Hough transform module and to the decision module, the scale estimation module arranged to calculate, at requests from the decision module, for steps of the iterative process, a value of a median estimate of scale and to communicate the calculated value of the median estimate of scale to the Hough transform module for use in determining the total supports, the decision module arranged to compare the calculated value of the median estimate of scale to a scale threshold and to stop the iterative process stopped hen the value of the median estimate of scale is smaller than the scale threshold, the decision module arranged to send requests to the scale estimation module for calculating the value of the median estimate of scale in every k:th step of the iterative process, k being an integer ≧1, k taken to be dependent on a current spatial resolution of the pixels and the current parameters resolutions t$_i$.

49. The device of claim 43, wherein the decision module is arranged to select, in selecting resolutions r$_i$ in the parameter space, the resolutions to have a relation to an expected maximum value of displacement of pixels from the region Y in the first image to the following image and to the size of the region.

50. The device of claim 49, wherein the decision module is arranged to select, after determining a parameter estimate, a second spatial resolution in which the first and following images are represented by the pixels, and then again executing in the iterative process the steps of determining the total support and of determining the motion parameters, and to preserve the relation of the resolutions in the parameter space in the steps that are again executed.

51. The device of claim 40, wherein the decision module is arranged to select a resolution t$_i$ in the parameter space for each of the parameters a$_i$, the selected resolution giving a grid of points in the N-dimensional space of possible parameter values, to thereafter determine, before determining the motion parameters a in an iterative process, a parameter estimate of the parameters a in a non-iterative process taking the parameter estimate be a point in the grid, to thereafter set the resolutions n to values smaller than the values used in the previous step of determining and to thereafter execute in the iterative process the determining of the parameters a taking in each step the parameters estimates to be a point in the grid.

52. The device of claim 40, further comprising a control module connected to the decision module, the decision module arranged to signal each step of the iterative process to the control module, and the control module arranged compare the number of steps in the iterative process to an iteration threshold and to stop the iterative process when the number of steps exceeds the iteration threshold.

53. The device of claim 40, further comprising a scale estimation module connected to the Hough transform module and to the decision module, the scale estimation module arranged to calculate, at requests from the decision module, for steps of the iterative process, a value of a median estimate of scale and to communicate the calculated value of the median estimate of scale to the Hough transform module for use in determining the total supports, the decision module arranged to compare the calculated value of the median estimate of scale to a scale threshold and to stop the iterative process stopped when the value of the median estimate of scale is smaller than the scale threshold.

54. The device of claim 53, wherein the decision module is arranged to send requests to the scale estimation module for calculating the value of the median estimate of scale in every step of the iteration process or in every k:th step of the iterative process, k being an integer >1.

55. The device of claim 40, wherein the decision module is arranged to store, for each step of iterative process, the estimated values of the parameters and to stop the iterative process when in the iterative process the same steps as before are taken.

56. The device of claim 40, further comprising a scale estimation module connected to the Hough transform module and to the decision module, the scale estimation module arranged to calculate, at requests from the decision module, for steps of the iterative process, a value of a medium estimate of scale and to communicate the calculated value of the median estimate of scale to the Hough transform module for use in determining the total supports, the median estimate of scale being calculated as a median absolute deviation (MAD) robust estimate of scale to which a positive constant is added.

57. The device of claim 56, wherein the scale estimate module is arranged to used a value of the positive constant equal to 0.3.

58. The device of claim 40, further comprising a control module connected to the Hough transform module and the decision module, the control module setting for the region Y a centre of the coordinate system for the pixels as the centre of gravity of the region.

59. The device of claim 40, further comprising a low-pass filtering module connected to the first memory means, the low-pass filtering module arranged to prefilter the first and following images by a low-pass filter and to store the prefiltered first and following images in the first memory means, the low pass-filtering module giving the prefiltered first and following images a dynamic range larger than the dynamic range of the first and following images, the Hough-transform module arranged to use the stored prefiltered first and following images in the steps of determining the total support.

60. The device of claim 59, wherein, the low-pass filtering module is arranged to use as the low-pass filter a Gaussian shape filter.

61. A device for estimating values of N parameters $a=(a_1, \ldots, a_N)$ of motion of a region Y in a first image to a following image, the region having a spatial extension, the first and following images represented, in a first spatial resolution, by intensities at pixels having coordinates in a coordinate system, the device comprising:

first memory means for storing the intensities at the pixels in the first spatial resolution, a Hough transform module connected to the first memory means for determining total supports $H(Y,a_p)$ as a sum of values of an error function for the intensities at pixels in the region Y and for parameters values $a_p$, a decision module connected to the Hough transform module, the decision module;

selecting a resolution $r_i$ in the parameter space for each of the parameters $a_i$, the selected resolution giving a grid of points in the N-dimensional space of possible parameter values, determining values of the parameters a that give the total support a minimum value, the determining being made in an iterative process, the decision module executing steps, selecting in each step a parameter estimate $a_n$ in a series of parameter estimates $a_1, a_2, \ldots$, the parameter estimates selected as points in the grid, providing the selected parameter estimate to the Hough transform module and receiving therefrom the determined total supports, and setting, after making each of the steps of the iterative process, the resolutions $r_i$ to values smaller than the values used in the step until the resolutions, in the setting thereof, have achieved predetermined values, and in the following steps setting the resolutions $r_i$ to smaller values only after every k:th step, where k is an integer >1.

62. A device for estimating values of N parameter $a=(a_1, \ldots, a_N)$ of motion of a region Y in a first image to a following image, the region having a spatial extension, the first and following images represented, in a first spatial resolution, by intensities at pixels having coordinates in a coordinate system, the device comprising:

first memory means for storing the intensities at the pixels in the first spatial resolution, a Hough transform module connected to the first memory means for determining total supports $H(Y,a_p)$ as a sum of values of an error function for the intensities at pixels in the region Y and for parameter values $a_p$, a decision module connected to the Hough transform module, the decision module:

selecting a resolution $r_i$ in the parameter space for each of the parameters $a_i$, the selected resolution giving a grid of points in the N-dimensional space of possible parameter values, determining values of the parameters a that give the total support a minimum value, the determining being made in an iterative process, the decision module executing steps, selecting in each step a parameter estimate $a_n$ in a series of parameter estimates $a_1, a_2, \ldots$, the parameter estimates selected as points in the grid, providing the selected parameter estimate to the Hough transform module and receiving therefrom the determined total supports, and a control module connected to the decision module, the decision module arranged to signal each step of the iterative process to the control module, and the control module arranged to compare the number of steps in the iterative process to an iteration threshold and to stop the iterative process when the number of steps exceeds the iteration threshold.

63. The device of claim 62, wherein the control module is arranged to select the iteration threshold to be dependent on a current spatial resolution of the pixels and the current resolutions $r_i$ of the parameters.

64. A device for estimating values of N parameters $a=(a_1, \ldots, a_N)$ of motion of a region Y in a first image to a following image, the region having a spatial extension, the first and following images represented, in a first spatial resolution, by intensities at pixels having coordinates in a coordinate system, the device comprising:

first memory means for storing the intensities at the pixels in the first spatial resolution, a Hough transform module connected to the first memory means for determining total supports $H(Y,a_p)$ as a sum of values of an error function for the intensities at pixels in the region Y and for parameter values $a_p$, a decision module connected to the Hough transform module, the decision module, selecting a resolution $r_i$ in the parameter space for each of the parameters $a_i$, the selected resolution giving a grid of points in the N-dimensional space of possible parameter values, determining values of the parameters a that give the total support a minimum value, the determining being made in an iterative process, the decision module executing steps, selecting in each step a parameter estimate $a_n$ in a series of parameter estimates $a_1, a_2, \ldots$, the parameter estimates selected as points in the grid, providing the selected parameter estimate to the Hough transform module and receiving therefrom the determined total supports, and a scale estimation module connected to the Hough transform module and to the decision module, the scale estimation module arranged to calculate, at requests from the decision module, for steps of the iterative process, a value of a median estimate of scale and to communicate the calculated value of the median estimate of scale to the Hough transform module for use in determining the total supports, the decision module arranged to compare the calculated value of the median estimate o scale to a scale threshold and to stop the iterative process stopped when the value of the median estimate of scale is smaller than the scale threshold.

65. The device of claim 64, wherein the decision module is arranged to send requests to the scale estimation module for calculating the value of the median estimate of scale in every step of the iteration process or in every k:th step of the iterative process, k being an integer >1.

66. The device of claim 65, wherein the decision module is arranged to take k as an integer $\geq 1$, k being dependent on a current spatial resolution of the pixels and the current parameter resolution $r_i$.

67. A device for estimating values of N parameters $a=(a_1, \ldots, a_N)$ of motion of a region Y in a first image to a following image, the region having a spatial extension, the first and following images represented, in a first spatial resolution, by intensities at pixels having coordinates in a coordinate system, the device comprising:

first memory means for storing the intensities at the pixels in the first spatial resolution, a Hough transform module connected to the first memory means for determining total supports $H(Y,a_p)$ as a sum of values of an error function for the intensities at pixels in the region Y and for parameter values $a_p$, a decision module connected to the Hough transform module, the decision module;

selecting a resolution $r_i$ i the parameter space for each of the parameters $a_i$, the selected resolution giving a grid of points in the N-dimensional space of possible parameter values, determining values of the parameters a that give the total support a minimum value, the determining being made in an iterative process, the decision module executing steps, selecting in each step a parameter estimate $a_n$ in a series of parameter estimates $a_1$, $a_2$, . . . . , the parameter estimates selected as points in the grid, providing the selected parameter estimate to the Hough transform module and receiving therefrom the determined total supports, and wherein the decision module is arranged to store, for each step of iterative process, the parameter estimates and to top the iterative process when in the iterative process the same steps as before are taken.

68. A device for estimating values of N parameters $a=(a_1, \ldots ,a_N)$ of motion of a region Y in a first image to a following image, the region having a spatial extension, the first and following images represented, in a first spatial resolution, by intensities at pixels having coordinates in a coordinate system, the device comprising:

first memory means for storing the intensities at the pixels in the first spatial resolution, a Hough transform module connected to the first memory means for determining total supports $H(Y,a_p)$ as a sum of values of an error function for pixels in the region Y and for parameter values $a_p$, a decision module connected to the Hough transform module, the decision module;

selecting a resolution $r_i$ in the parameter space for each of the parameters $a_i$, the selected resolution giving a grid of points in the N-dimensional space of possible parameter values, determining values of the parameters a that give the total support a minimum value, the determining being made in an iterative process, the decision module executing steps, selecting in each step a parameter estimate $a_n$ in a series of parameter estimates $a_1$, $a_2$, . . . , the parameter estimates selected as points in the grid, providing the selected parameter estimate to the Hough transform module and receiving therefrom the determined total supports, and a scale estimate module connected to the Hough transform module and to the decision module, the scale estimation module arranged to calculate, at requests from the decision module, for steps of the iterative process, a value of a median estimate of scale and to communicate the calculated value of the median estimate of scale to the Hough transform module for use in determining the total supports, the median estimate of scale being calculated as a median absolute deviation (MAD) robust estimate of scale to which a positive constant is added.

69. The device of claim 68, wherein the scale estimation module is arranged to used a value of the positive constant equal to 0.3.

70. The device for estimating values of N parameters $a=(a_1, \ldots , a_2)$ of motion of a region Y in a first image to a following image, the region having a spatial extension, the first and following images represented, in a first spatial resolution, by intensities at pixels having coordinates in a coordinates system, the device comprising:

first memory means for storing the intensities at the pixels in the first spatial resolution, a Hough transform module connected to the first memory means for determining total supports $H(Y,a_p)$ as a sum of values of an error function for the intensities at pixels in the region Y and for parameter values $a_p$, a decision module connected to the Hough transform module, the decision module:

selecting a resolution $r_i$ in the parameter space for each of the parameters $a_i$, the selected resolution giving a grid of points in the N-dimensional space of possible parameter values, determining values of the parameters a that give the total support a minimum value, the determining being made in an iterative process, the decision module executing steps, selecting in each step a parameter estimate $a_n$ in a series of parameter estimates $a_1$, $a_2$, . . . , the parameter estimates selected as points in the grid, providing the selected parameter estimate to the Hough transform module and receiving therefrom the determined total supports, and a control module connected to the Hough transform module and the decision module, the control module setting for the region Y a centre of the coordinate system for the pixels as the centre of gravity of the region.

71. A device for estimating values of N parameters $a=(a_1, \ldots , a_N)$ of motion of a region Y in a first image to a following image, the region having a spatial extension, the first and following images represented, in a first spatial resolution, by intensities at pixels having coordinates in a coordinate system, the device comprising:

first memory means for storing the intensities at the pixels in the first spatial resolution, a Hough transform module connected to the first memory means for determining total supports $H(Y,a_p)$ as a sum of values of an error function for the intensities at pixels in the region Y and for parameter values $a_p$, a decision module connected to the Hough transform module, the decision module:

selecting a resolution $t_i$ in the parameter space for each of the parameters $a_i$, the resolutions selected to have a relation to an expected maximum value of displacement of pixels from the region Y in the first image to the following image and to the size of the region, the selected resolution giving a grid of points in the N-dimensional space of possible parameter values, determining values of the parameters a that give the total support a minimum value, the determining being made in an iterative process, the decision module executing steps, selecting in each step a parameter estimate $a_n$ in a series of parameter estimates $a_1$, $a_2$, . . . . , the parameter estimates selected as points in the grid, providing the selected parameter estimate to the Hough transform module and receiving therefrom the determined total supports.

72. The device of claim 71, wherein the decision module is arranged to selected, after determining a parameter estimate, a second spatial resolution in which the first and following images are represented by the pixels, and then again executing in the iterative process the steps of determining the total support and of determining the motion parameters, and to preserver the relation of the resolutions in the parameter space in the steps that are again executed.

73. A device for estimating values of N parameters $a=(a_1, \ldots, a_N)$ of motion of a region Y in a first image to a following image, the region having a spatial extension, the first and following images represented, in a first spatial resolution, by intensities at pixels having coordinates in a coordinate system, the device comprising:

first memory means for storing the intensities at the pixels in the first spatial resolution, a low-pass filtering module connected to the first memory means, the low-pass filtering module arranged to prefilter the first and following images by a low-pass filter and to store the prefiltered first and following images in the first memory means, the low pass-filtering module giving the prefiltered first and following images a dynamic range larger than the dynamic range of the first and following images, a Hough transform module connected to the first memory means for determining total supports $H(Y,a_p)$ as a sum of values of n error function for the intensities at pixels in the region Y using the stored prefiltered first and following images, a decision module connected to the Hough transform module, the decision module determining values of the parameters a that give the total support a minimum value, the determining being made in an iterative process, the decision module executing steps, selecting in each step a parameter estimate $a_n$ in a series of parameter estimates $a_1, a_2, \ldots$, providing the selected parameter estimate to the Hough transform module and receiving therefrom the determined total supports evaluating the received calculated partial derivatives for selecting a new parameter estimate $a_{n+1}$ to be used in the following step.

74. The device of claim 73, wherein the low-pass filtering module is arranged to use as the low-pass filter a Gaussian shape filter.

75. A device for estimating values of N parameters $a=(a_1, \ldots, a_N)$ of motion of a region Y in a first image to a following image, the region having a spatial extension, the first and following images represented, in a first spatial resolution, by intensities at pixels having coordinates in a coordinate system, the device comprising:

first memory means for storing the intensities at the pixels in the first spatial resolution, a Hough transform module connected to the first memory means for determining total supports $H(Y,a_p)$ as a sum of values of an error function for the intensities at pixels in the region Y and for parameter values $a_p$ and for calculating partial derivatives $dH_i=MH(Y,a_p)/Ma_{p,i}$ of the total support for parameter values $a_p$ with respect to each of the parameters $a_i$, a decision module connected to the Hough transform module, the decision module, selecting a resolution $r_i$ in the parameter space for each of the parameters $a_i$, the resolutions selected to have a relation to an expected maximum value of displacement of pixels from the region Y in the first image to the following image and to the size of the region, the selected resolution giving a grid of points in the N-dimensional space of possible parameter values, determining values of the parameters a that give the total support a minimum value, the determining being made n an iterative process, the decision module executing steps, selecting in each step a parameter estimate $a_n$ in a series of parameter estimates $a_1, a_2, \ldots$, the parameter estimates selected as points in the grid, providing the selected parameter estimate to the Hough transform module and receiving therefrom the determined total supports and the calculated partial derivatives for the parameter estimate $a_n$ and evaluating the received calculated partial derivatives for selecting a new parameter estimate $a_{n+1}$ to be used in the following step;

wherein the decision module in the evaluating is arranged to use scaled partial derivatives obtained from the received calculated partial derivatives $dH_i$ by multiplying them by scaling factors having values corresponding to the resolutions $r_i$ in the parameter space, so that the scaled partial derivatives are $dHN_i=dH_iA\ r_i$.

76. The device of claim 75, wherein the decision module is arranged to form, in each step of the iterative process, in the evaluating of the partial derivatives, a gradient vector $vd=(dHN_1, \ldots, dHN_N)$ of the sealed partial derivatives for the parameter estimate $a_n$ selected in the step and to multiply the gradient vector by normalized vectors $b^1, \ldots, b^s$ to form quantities $M^j=vd\ X\ b^j$, the normalized vectors obtained by normalizing vectors extending in the N-dimensional parameter space from the parameter estimate $a_n$ to all neighbouring points in the grid, and taking the neighbouring point having the maximum vale of said quantities to be the parameter estimate $a_{p+1}$ to be selected in the next step.

77. The device of claim 75, wherein the decision module is arranged to select, after having determined the parameters a that give the total support a minimum value, the resolution $r_i$ in the parameter space to a finer resolution for each of the parameters $a_i$, and to thereafter again determine the motion parameters a that give the total support a minimum value for the finer resolution, using the grid of points given thereby.

* * * * *